(No Model.)
J. McCAHEY.
FRICTION CLUTCH PULLEY.
No. 522,531. Patented July 3, 1894.
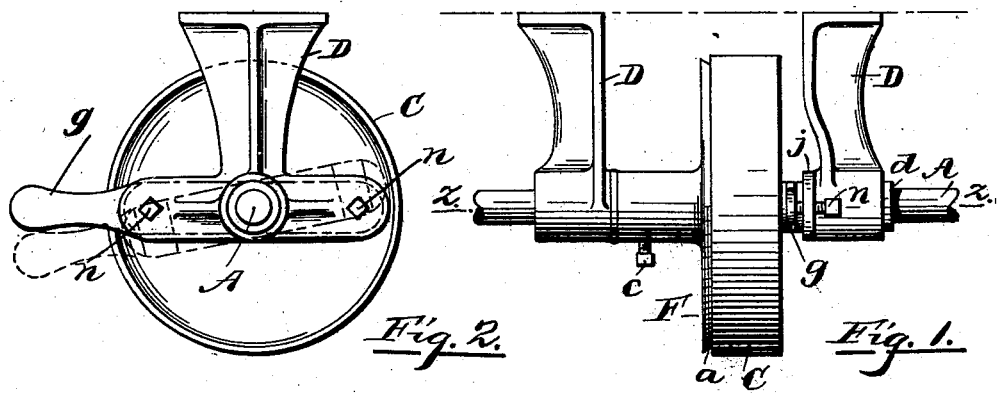
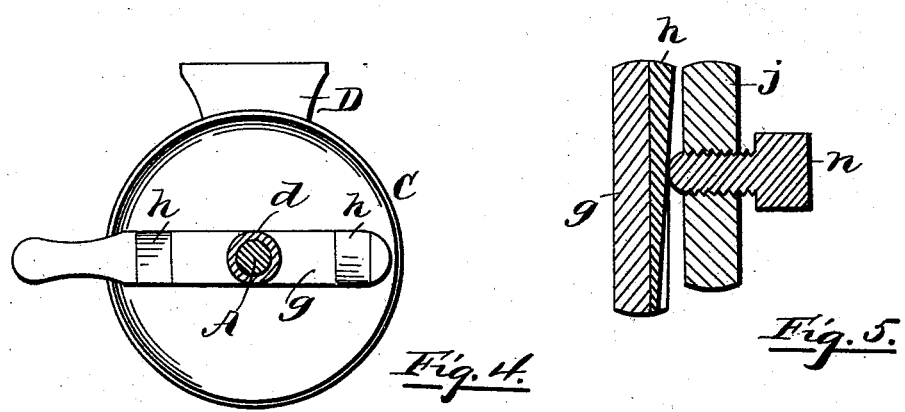
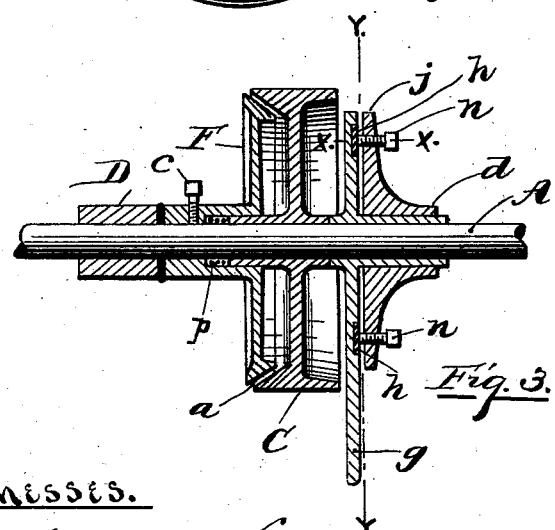
Witnesses.
Charles F. Hannigan.
James E. Arnold
Inventor.
John McCahey
by Benj. Arnold
Atty.

UNITED STATES PATENT OFFICE.

JOHN McCAHEY, OF PROVIDENCE, RHODE ISLAND, ASSIGNOR TO THE NEW ENGLAND BUTT COMPANY, OF SAME PLACE.

FRICTION-CLUTCH PULLEY.

SPECIFICATION forming part of Letters Patent No. 522,531, dated July 3, 1894.

Application filed August 14, 1893. Serial No. 483,059. (No model.)

*To all whom it may concern:*

Be it known that I, JOHN MCCAHEY, of Providence, in the county of Providence and State of Rhode Island, have invented certain new and useful Improvements in Friction-Clutches; and I do hereby declare that the following is a full, clear, and exact description thereof, reference being had to the accompanying drawings, and to the letters of reference marked thereon, which form a part of this specification.

This invention relates to that class of clutches called "friction clutches," in which the connection between the pulley and the shaft, is an intermittent, frictional one. It is fully illustrated in the accompanying drawings.

Figure 1, shows a front elevation of the pulley, on a shaft held in hangers. Fig. 2, represents an elevation of the right end of the pulley, as shown in Fig. 1. Fig. 3, is a section view of the mechanism, taken through the center on line $z\ z$, in Fig. 1, with the shaft in elevation. Fig. 4, shows a face view of the pulley and lever, on line $y, y$, in Fig. 3. Fig. 5, is a vertical section of the lever and arm, taken on line $x, x$, Fig. 3.

The improvements in the pulley are intended to obviate some of the faults of frictional clutches. The conical surface contact, has long been in use; but most of the pulleys are arranged to use toggle-jointed levers to produce contact, and the joints of these levers are allowed to pass the line of the centers, to hold the frictional surface from being thrown out while running. This position makes it hard to throw the mechanism out of contact, to stop the pulley, if there is much power applied to drive the machine. This great increase of power required to throw the mechanism out of operation, makes it impossible to operate it on machines where delicate stop motions are required, as in braiding machines, for which this invention is more especially designed, and another advantage is that the pulley slides much easier, because it is moving around the shaft and has a wringing motion similar to that given by the hand to a pulley in putting it on or off of a shaft by hand, where it would not readily slide straight on. In the usual manner with friction pulleys, the part that slides to stop or start the machine, revolves with the part on which it slides, and does not have the advantage of this wringing motion to enable it to slide easily.

The construction is as follows:

The shaft A, is held in bearings on the hangers D, D, or standards if placed on a bench or floor.

C, is a pulley fitted loosely on the shaft A, and having a hub on each side to give it a steady bearing on the shaft.

F, is a friction plate, which is made fast on the shaft A, by means of a set screw $c$, in its hub. This plate F, has a bevel face at $a$, extending in on a flange on the inner face of the plate. This bevel $a$, fits into a like bevel face made on the inside of the pulley C. A spiral spring $p$, is placed between the end of the hub and the bottom of the recess in plate F.

Two arms $j, j$, are made on one of the hangers D, one on each side of the bearing, and a lever $g$, is placed on the shaft A, between the pulley and the bearing. This lever $g$, is free to slide or turn on the shaft, and has a hub $d$, on its outer side, that extends through the bearing on the hanger D, and is for the purpose of holding the lever square to the shaft.

A flat, wedge-shaped piece of steel $h$, is inserted in the outer face of the lever $g$, on each side of the shaft, a short distance in from the rim of the pulley, and a set screw $n$, is fitted to screw through each arm $j$, in position to be opposite to the steel plates $h$.

The plates $h$, are preferably held in recesses in the face of the lever $g$, by undercutting the sides of the recesses and beveling the edges of the plates to correspond, and driving the plates in tight. The position of one of the plates $h$, is shown in the enlarged section of the lever, Fig. 5. The plate $h$, on the other end of the lever $g$, is put in a reversed position; that is, with its thin end up. The lever $g$, is extended out beyond the pulley on one side, to serve as a handle to move it by. Power may be continuously applied to either the shaft or to the pulley, and the operation of driving one by the other, will be the same. I will suppose in this case, that power is applied to the pulley by a belt, and is to drive the shaft by friction. When the handle of the lever $g$, is down, as represented by the partly broken lines in Fig. 2, the thin ends of the steel plates *h*, are opposite the set screws *n, n*, and the lever and pulley are kept from the friction plate F, by the spiral spring *p*, so the shaft will not be turned.

To start the shaft, the lever *g*, is raised by the handle to the upper position seen in Fig. 2, which brings the thick ends of the steel plates *h*, opposite the set screws *n, n*, and the lever *g*, is crowded away from the hanger D, so as to push the pulley against the plate F, and bring the beveled parts *a*, in contact with sufficient force to cause the pulley to drive the plate and shaft, to which the plate is fast. This arrangement requires but little motion of the pulley sidewise on the shaft, to free it from the plate F, and allow the shaft to stop or to start it, which makes it applicable in situations where the room is limited.

The motion given by the hand to the lever in starting, is not in the direction of the line of the shaft, as is usual in friction clutches; but is made in a direction square to the shaft, as there is usually more room that way.

The plates *h, h*, and the ends of the set screws *n, n*, are hardened and polished, so that however much the power applied to the pulley may be increased, it will not appreciably increase the slight power required to throw the lever *g*, down, and stop the shaft by allowing the spring *p*, to move the pulley away from the plate F. This obviates the difficulty above noted, and makes it easy to operate with the most delicate stop motions. The length of hub given to the pulley by running it in under the friction plate F, obviates another great trouble in friction pulleys, as it is usual to leave off the hub on that side, to make room for the friction devices, consequently, the hole in that side of the pulley, wears out in a "bell-muzzle"-shape, allowing the pulley to cant over and wabble on the shaft. The proper adjustment of motion of the lever, can be made, or any wear of the parts can be taken up, by means of the set screws *n, n*.

Having thus described my improvements, I claim as my invention—

1. In a friction clutch, a pulley and a plate having friction surfaces between them, in combination with a lever having wedge-shaped plates attached thereto, and a bearing having a cross bar with set screws arranged to bear on said plates, substantially as described.

2. In a friction clutch, the following instrumentalities: a friction plate fast on a shaft, a pulley loose on said shaft and having a hub extending within the hub of said friction plate, a spring held between said pulley and plate, a lever on the opposite side of said pulley and arranged to swing on said shaft, wedge-shaped plates attached to said lever, and arranged to press against stationary set screws, substantially as described.

JOHN McCAHEY.

Witnesses:
BENJ. ARNOLD,
E. B. READ.